G. W. CONNOR.
ROTARY TURBINE ENGINE.
APPLICATION FILED JAN. 24, 1917.

1,283,088.

Patented Oct. 29, 1918.
4 SHEETS—SHEET 1.

Witnesses
F. C. Gibson.
P. M. Smith.

Inventor
G. W. Connor.
By Victor J. Evans,
Attorney

G. W. CONNOR.
ROTARY TURBINE ENGINE.
APPLICATION FILED JAN. 24, 1917.
1,283,088.
Patented Oct. 29, 1918.
4 SHEETS—SHEET 2.
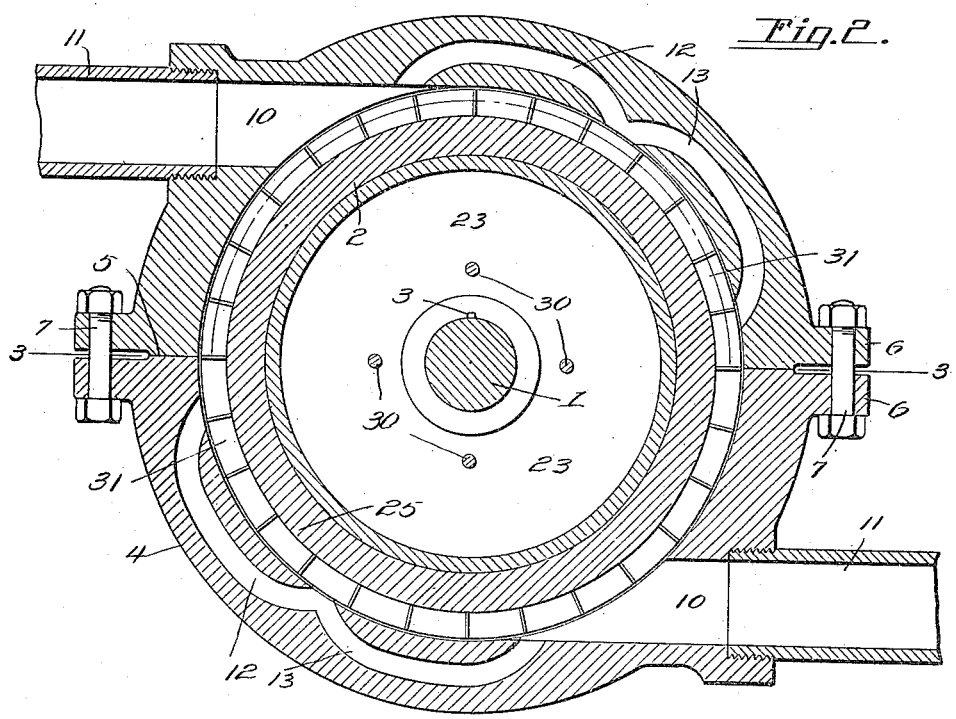
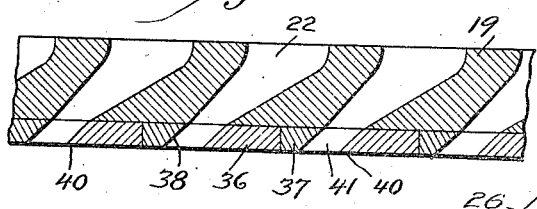
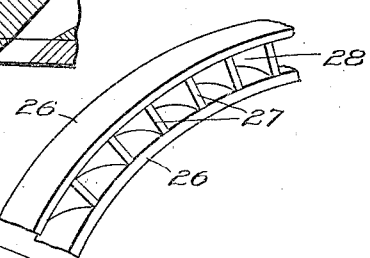
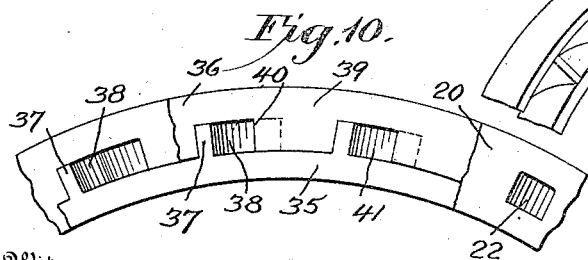
G. W. Connor, Inventor
Witnesses
F. C. Gibson
R. M. Smith
By Victor J. Evans
Attorney

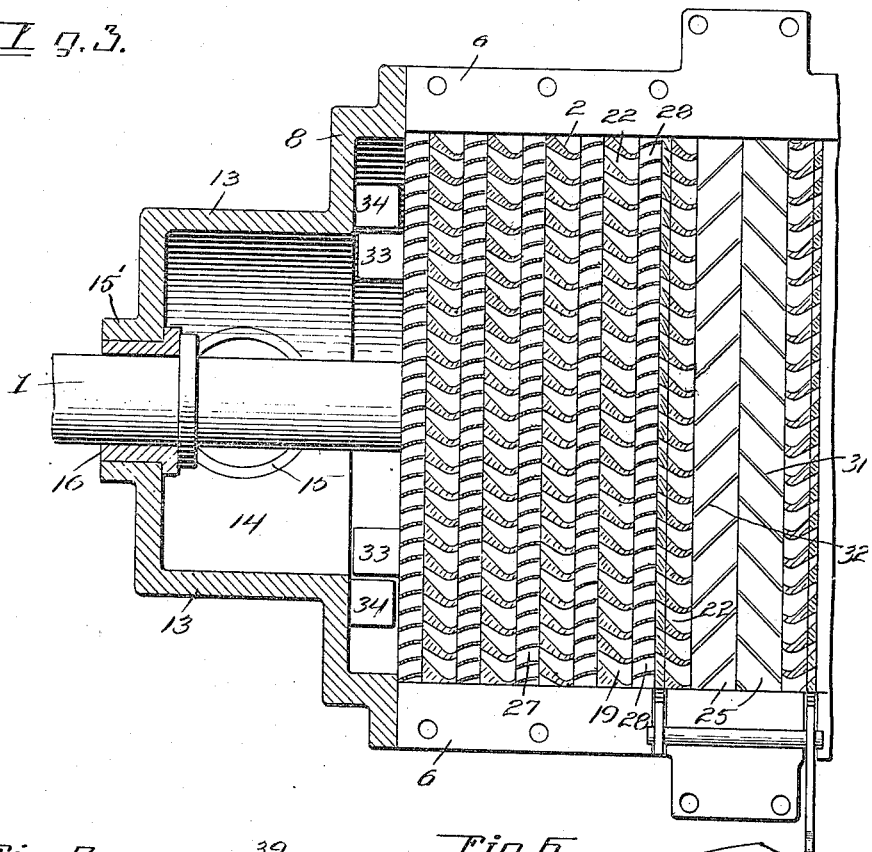
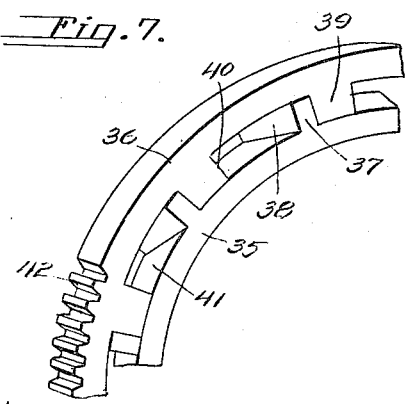
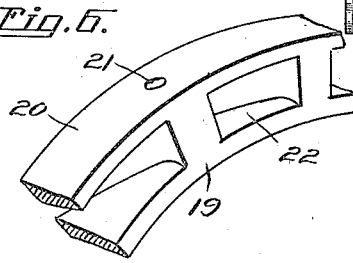

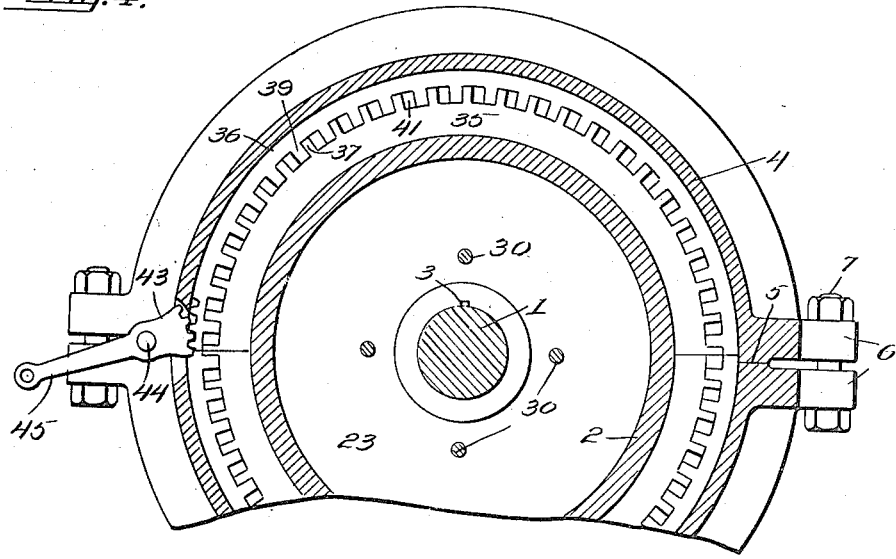
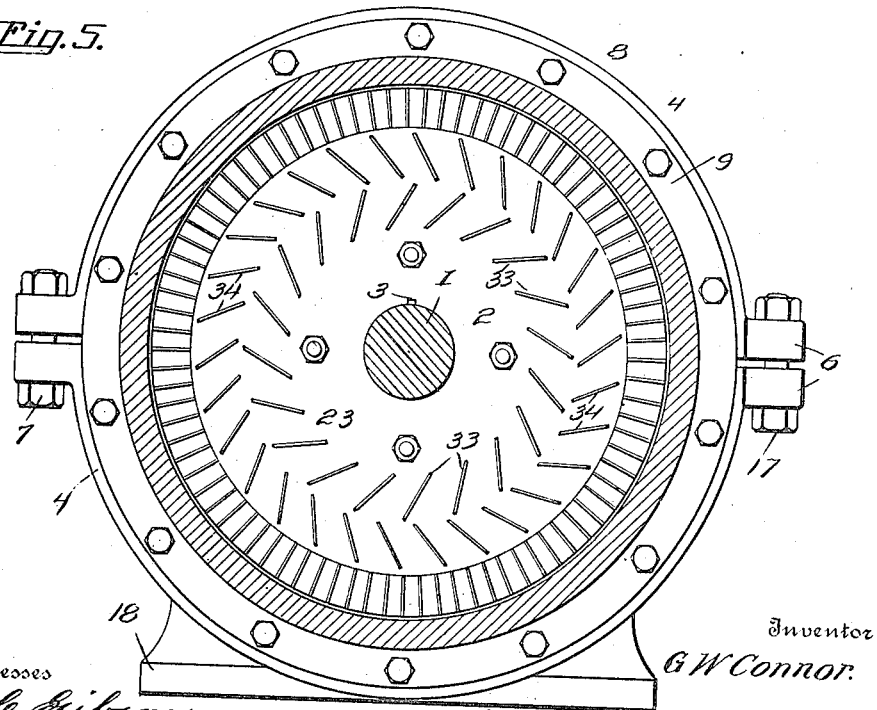

UNITED STATES PATENT OFFICE.

GEORGE W. CONNOR, OF BEARWALLOW, NORTH CAROLINA, ASSIGNOR OF ONE-HALF TO D. C. PACE, OF HENDERSONVILLE, NORTH CAROLINA.

ROTARY TURBINE-ENGINE.

1,283,088.

Specification of Letters Patent.

Patented Oct. 29, 1918.

Application filed January 24, 1917. Serial No. 144,250.

*To all whom it may concern:*

Be it known that I, GEORGE W. CONNOR, a citizen of the United States, residing at Bearwallow, in the county of Henderson and State of North Carolina, have invented new and useful Improvements in Rotary Turbine-Engines, of which the following is a specification.

This invention relates to rotary or turbine engines, the object in view being to produce a light, compact and powerful engine of the class referred to especially adapted for use as a steam engine but being operable by any expansive fluid, the engine embodying in connection with a stationary casing and a rotor mounted on a rotary shaft, one or more substantially central intakes, and end exhaust chambers, a novel arrangement of expansion ports and velocity increasing ports located between the inner wall of the casing and the outer periphery of the rotor, said ports being disposed in two series progressively increasing in capacity from the intake to the exhaust chambers.

A further object in view is to provide in connection with the expansion and velocity increasing ports above referred to, circular and concentric series of vanes between the heads of the rotor and the heads of the casing, one series having a fixed relation to the stationary casing and the other series having a fixed relation to the rotor and both of the series being inclined reversely to each other and being arranged in the path of the steam between the first named expansion ports and velocity increasing ports and the exhaust chambers so that the steam or other fluid will be practically reduced to atmospheric pressure before the final exhaust thereof.

A further object in view is to provide one or more intakes each having one or more branch or extension passages by which the steam or other fluid is discharged at different points along the periphery of the rotor.

Another object in view is to provide one or more sets of devices for controlling the quantity of steam or other fluid admitted to the expansion ports and velocity increasing ports, each of said devices embodying an annular series of passages the capacities of which are variable.

With the above and other objects in view, the invention consists in the novel construction, combination and arrangement of parts, as herein described, illustrated and claimed.

In the accompanying drawings:—

Fig. 2 is a central transverse section on the line 2—2 of Fig. 1.

Fig. 3 is an irregular section taken on the line 3—3 of Fig. 2 and diagrammatically illustrating the expansion ports and velocity increasing ports, together with the centrally arranged blades and the end vanes.

Fig. 4 is a vertical transverse section on the line 4—4 of Fig. 1.

Fig. 5 is a section on the line 5—5 of Fig. 1.

Fig. 6 is a fragmentary perspective view of one of the casing flanges.

Fig. 7 is a fragmentary perspective view of one of the steam regulating devices.

Fig. 8 is a fragmentary perspective view of the steam regulating means.

Fig. 9 is a similar view of one set of flanges and vanes.

Fig. 10 is a fragmentary inner face view of the steam regulating means.

Figure 1:
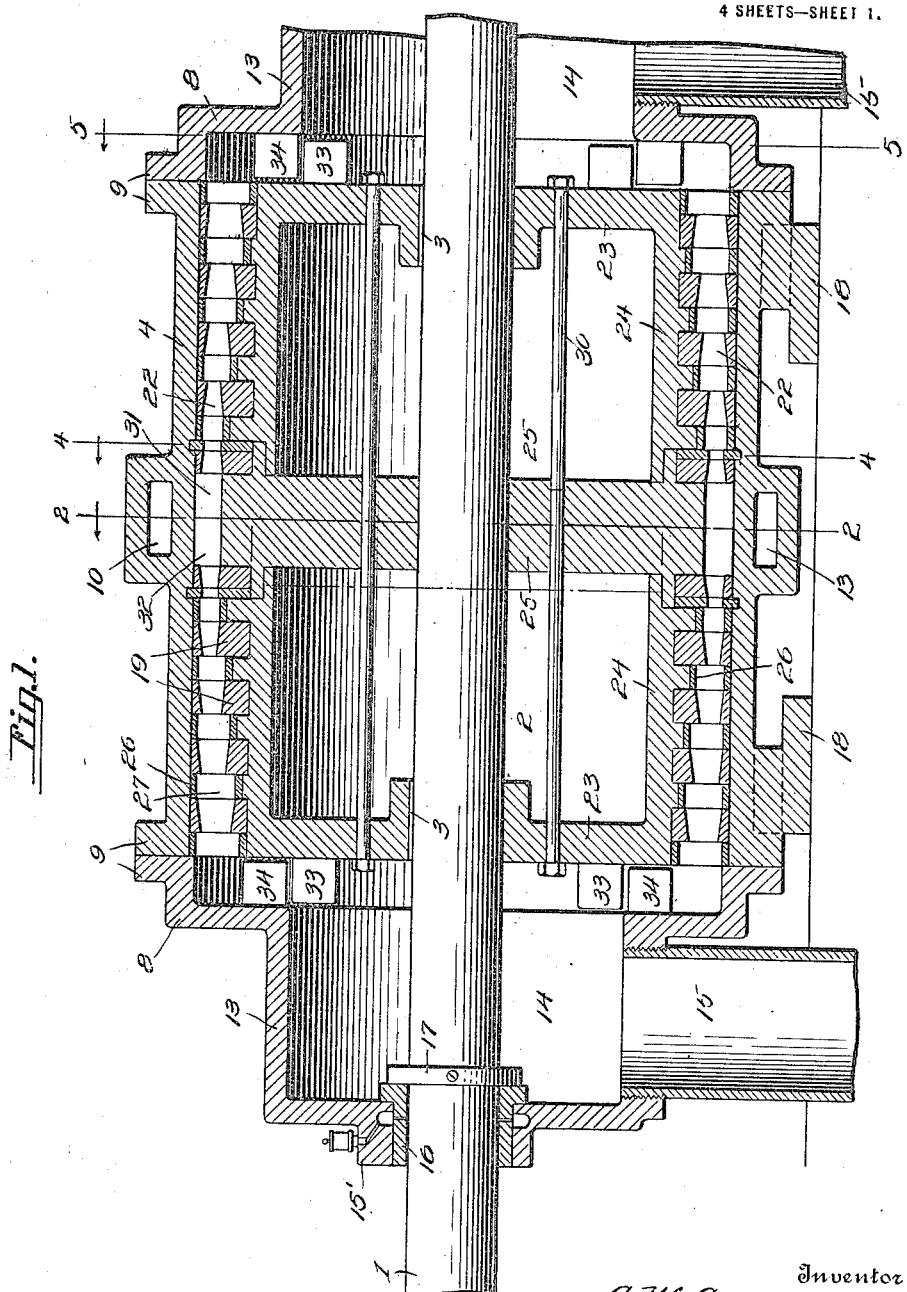
Figure 1 is a diametrical longitudinal section of a turbine engine embodying the present invention, showing the rotor shaft in elevation.

Referring to the drawings, 1 designates the engine shaft on which the rotor 2 is fixedly mounted, the same being shown as keyed thereto at 3. 4 designates the rotor casing which is diametrically divided into sections along the line 5 of Figs. 2 and 4, the sections being provided with bolt-receiving lugs 6 enabling the sections of the casing 4 to be securely clamped and fastened together by bolts 7. This enables one-half of the central portion of the rotor casing to be removed to give access to the mechanism contained within the casing.

In addition to the central section of the casing indicated at 4, the casing comprises the chambered heads 8 and adjacent to their meeting faces, the central and head sections of the casing are flanged as shown at 9 so that they may be bolted or otherwise fastened together. As illustrated in Figs. 1 and 2, the casing is provided with intake orifices 10 to which supply pipes 11 are shown connected. Each of the intakes is disposed substantially in tangential relation to the rotor and inner wall of the casing as clearly shown in Fig. 2 and is further provided with one or more branch or extension passages 12 and 13 through which the steam or other fluid is conducted to different points along the periphery of the rotor and centrally thereof, the intakes 10 being illustrated as centrally arranged in Fig. 1.

Each of the heads 8 is formed with a hollow cylindrical extension 13 forming one of a pair of end exhaust chambers 14 from which an exhaust pipe 15 leads off to any suitable point. The end of each extension 13 forms a bearing 15' for the rotor shaft 1, 16 designating a bushing within the bearing 15' around the shaft 1, and 17 designating a collar on the shaft 1 which abuts against the bushing 16 to prevent end movement of the shaft 1 and the rotor 2. The casing 4 is shown as provided with supporting feet 18.

The casing 4 is provided on the inner cylindrical wall thereof with flanges 19 which in the preferred embodiment of the invention and for the sake of economy in manufacture are formed separately from the casing and fixedly secured thereto in any desired manner. A fragment of one of said flanges is illustrated in Fig. 6 in which it will be observed that the flange comprises a separately formed outer band 20 which is fastened at 21 to the main body of the flange. Each of the flanges 19 is formed with an annular series of velocity increasing ports 22 each of which is shaped as shown in Fig. 3, being widest at the receiving end and narrowest at the discharge end and being of arcuate or substantially parabolic curvature in the direction in which the steam or other fluid moves, the discharge ends of the ports 22 being disposed at an oblique angle so as to direct the steam at a corresponding angle against the vanes which form the expansion chambers hereinafter more particularly referred to. The flanges 19 are arranged in spaced relation to each other as shown in Fig. 1 and are also arranged in two groups one at the right and one at the left hand side of the intakes 10.

The rotor is generally cylindrical in shape and provided with the closed ends or heads 23 and comprises the substantially equal sections 24 and intermediate disk-like sections 25 which meet on a central line. On its outer face the rotor 2 is provided with flanges each comprising a circular base portion 26 and obliquely arranged vanes 27 extending outwardly and radially therefrom and curved in cross section as best illustrated in Fig. 3, the vanes 27 forming between them intervening expansion chambers 28 and said vanes being pitched at a reverse angle to the web-like solid portions 29 of the flanges 19, the expansion chambers 28 thus being disposed at a reverse angle to the velocity increasing chambers 22. The flanges on the outer cylindrical surface of the rotor are fixed in relation to the latter and are arranged in spaced relation to each other so as to work between and alternate with the flanges 19 of the casing. By reference to Fig. 1 it will be observed that the expansion ports and the velocity increasing ports progressively increase in capacity from the intake, in opposite directions to the end exhaust chambers 14, thus obtaining a compound action of the steam which gradually expands from the intake to the exhaust. This increased capacity of the velocity increasing ports is obtained by increasing the depth radially of said ports as clearly shown in Fig. 1, and the progressively increasing capacity of the expansion ports is obtained in the same manner as also clearly evident in Fig. 1. The sections of the rotor may be secured in fixed relation to each other by means of tie bolts 30 as shown in Fig. 1 or they may be secured together in any other desired or convenient way.

By reference to Fig. 3 it will be seen that the rotor sections 25 are provided on their peripheries with obliquely disposed blades 31 and 32, the blades being arranged in two series as shown, the blades of one series being parallel to each other and reversely inclined with respect to the blades of the other series. Furthermore, it will be seen that the inner extremities of the blades 31 and 32 are staggered in relation to each other so that the steam impinges against the inwardly inclined sides of the blades 31 and 32 and passes around the staggered inner edges thereof so that a full supply of steam is carried to all of the spaces between the blades 31 and 32 and diverted to the initial set of velocity increasing chambers nearest the center of the engine and immediately on opposite sides of the rotor sections 25.

Projecting outwardly from the opposite heads 23 of the rotor are circular series of obliquely disposed vanes 33 and other vanes 34 extend inwardly from the heads 8 of the casing in overlapping and concentric relation to the vanes 33, both sets of vanes 33 and 34 being located between the heads of the casing and the heads of the rotor and between the outermost series of expansion chambers and the exhaust chambers 14, the steam being thus directed into the exhaust chambers 14 approximately at atmospheric pressure.

In connection with one or more of the flanges 19 of each group at opposite sides of the intakes, I employ steam regulating means the same comprising a stationary annulus 35 and an oscillatory annulus 36, the last named annulus having a limited turning movement around the fixed annulus 35. The annulus 35 has a fixed relation to the adjacent flange 19 of the casing 4 and is provided on its outer peripheral face with bosses 37 each of which has an inclined or oblique face 38. The annulus 36 is likewise provided on its inner face with a corresponding series of bosses 39 each of which has an inclined or oblique face 40. The oblique faces of the bosses 37 and 39 are disposed toward each other and therefore when the annulus 36 is turned in one direction or the other around the annulus 35, the oblique faces 38 and 49 will be shifted toward or away from each other correspondingly decreasing or increasing the capacity of said steam passages.

In order to operate the annulus 36, the latter is provided on its outer periphery with teeth 42 which are engaged by a sector gear 43 mounted on a rock shaft 44 from which an operating arm 45 extends outwardly enabling any suitable operating connection to be attached thereto and located within reach of the attendant of the engine. I do not desire, however, to be limited to the particular means shown and described for turning the annulus 36 as other expedients may be employed for the purpose.

From the foregoing description, taken in connection with the accompanying drawings, it will now be understood that the steam is admitted through the orifices 10 disposed tangentially to the rotor and impinges directly against the blades 31 and 32, imparting rotary motion thereto and to the shaft 1. At the same time, steam is conducted through the extension passages 12 and is discharged at different points through the inner wall of the casing against said blades 31 and 32. The blades 31 and 32 divert or change the direction of flow of the steam which is then delivered to the first set of velocity increasing chambers 22, the steam is then delivered at increased velocity against the adjacent set of vanes 27 and passes through the expansion chambers 28. The steam continues in the same manner through the several sets or stages of velocity increasing chambers and expansion chambers which as above stated progressively increase in capacity from the intake to the exhaust chambers and after leaving the final series of exhaust chambers, the steam is directed by the stationary vanes 34 against the vanes 33 on the opposite heads 23 of the rotor, the steam then reaching the exhaust chambers 14 from which it may escape through the connections 15 above referred to.

In case the full power of the engine is not required, the annulus 36 may be turned in the proper direction to decrease the capacity of the steam passages 41 thereby greatly economizing in the consumption of steam. By means of the annulus 36, any desired flow of steam may thus be provided for according to the load imposed on the engine shaft.

It will, of course, be understood that the number of sets or stages of velocity increasing ports and expansion ports may be increased or diminished in accordance with the H. P. required, it being preferable, however, to employ the same number of stages or sets on both sides of the intake so that the end thrust on the rotor 2 and the shaft 1 will be practically equalized. It will further be understood that the invention is susceptible of many other changes in the form, proportion and minor details of construction which may accordingly be resorted to without departing from the principle or sacrificing any of the advantages of the invention.

Having thus described my invention, I claim:—

In a rotary turbine engine, the combination of a stationary cylindrical casing having a substantially central intake and end exhaust chambers, a generally cylindrical rotor in said casing, a rotor shaft on which said rotor is fixedly mounted, groups of turbine flanges surrounding the rotor having a fixed relation to the latter and formed with oblique expansion ports progressively increasing in capacity from the intake to the exhaust chambers, said flanges being arranged in spaced relation to each other, other groups of flanges having a fixed relation to the inside wall of the rotor casing interposed between the first named flanges and formed with oblique vanes and intervening velocity increasing ports progressively increasing in capacity from the intake to the exhaust chambers, an annulus having a fixed relation to one of the casing flanges of each group and provided on its outer periphery with bosses each having an oblique face, an oscillatory annulus encircling the fixed annulus and provided on its inner face with bosses each having an oblique face movable toward and away from the oblique face of the fixed annulus to form fluid passages of variable capacity, and means for shifting said oscillatory annulus, the said stationary annulus and oscillatory annulus being positioned between two adjacent circular series of vanes.

In testimony whereof I affix my signature in presence of a witness.

GEORGE W. CONNOR.

Witness:
BENNETT S. JONES.

Copies of this patent may be obtained for five cents each, by addressing the "Commissioner of Patents, Washington, D. C."